United States Patent [19]

Scott et al.

[11] E Re. 29,519

[45] Reissued Jan. 17, 1978

[54] PUMPS

[75] Inventors: George William Pearson Scott, Stroud; Kenneth Henry Lloyd, Gloucester, both of England

[73] Assignee: Severn Pumps Limited, Great Britain

[21] Appl. No.: 699,688

[22] Filed: June 25, 1976

Related U.S. Patent Documents

Reissue of:

[64] Patent No.: 3,818,803
Issued: June 25, 1974
Appl. No.: 307,942
Filed: Nov. 20, 1972

[30] Foreign Application Priority Data

Nov. 24, 1971 United Kingdom ..... 54303/71

[51] Int. Cl.[2] ..... I01B 13/04
[52] U.S. Cl. ..... 91/499
[58] Field of Search ..... 91/499–507, 91/6.5; 417/900

[56] References Cited

U.S. PATENT DOCUMENTS

| | | | |
|---|---|---|---|
| 985,835 | 3/1911 | Porter | 91/506 |
| 1,483,199 | 2/1924 | Schinkez | 91/507 |
| 2,633,104 | 3/1953 | Lauck et al. | 91/505 |
| 3,270,686 | 9/1966 | Thompson | 91/505 |

FOREIGN PATENT DOCUMENTS

| | | | |
|---|---|---|---|
| 1,926,278 | 11/1970 | Germany | 91/481 |
| 895,070 | 4/1962 | United Kingdom | 417/900 |

*Primary Examiner*—William L. Freeh
*Attorney, Agent, or Firm*—Young & Thompson

[57] ABSTRACT

An axial piston pump is adapted to pump concrete or other slurries. On the suction side a wedge device is arranged to direct the concrete into or away from the cylinders according to whether the solid lumps are correctly placed for easy entry into the cylinders or likely to cause an obstruction at the downstream end of the suction side. A water barrier separates the concrete space from the oil filled drive mechanism and there is water lubrication of the working face of the cylinder block.

16 Claims, 5 Drawing Figures

PUMPS

Figure 1:
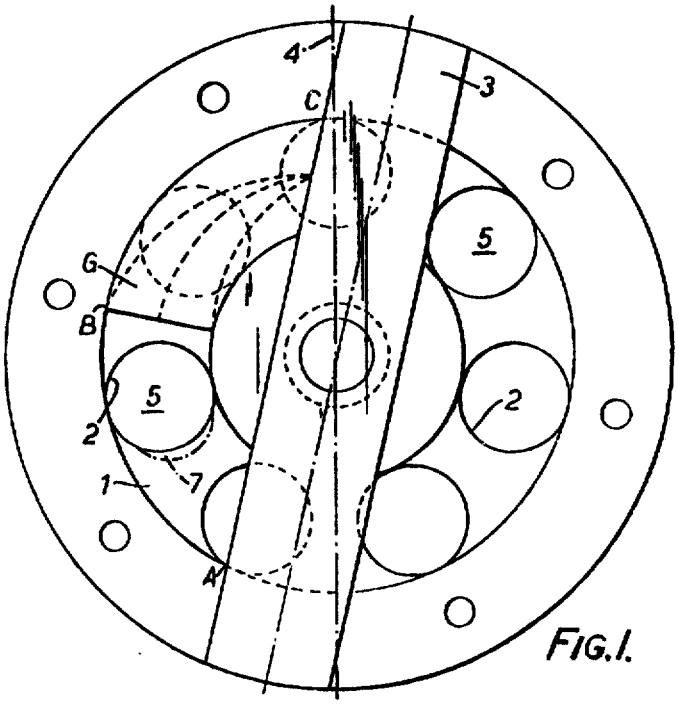

Matter enclosed in heavy brackets [ ] appears in the original patent but forms no part of this reissue specification; matter printed in italics indicates the additions made by reissue.

This invention relates to pumps and is particularly concerned with those suitable for pumping concrete and other abrasive media and slurries, with or without solids in suspension.

Most known pumps for concrete are single or more generally twin cylinder machines with reciprocating pistons and associated valves for controlling the flow to and from the cylinders. There are a number of drawbacks with these pumps. Great care has to be taken with the valve design to avoid malfunction due to the solids in suspension. The concrete flow tends to pulse since it requires enormous pressure to start a slug of liquid contrete moving in a pipeline due to the high friction that exists, and the start of each piston stroke is wasted in compressing the concrete and any air entrained therewith. Thus pulsing, apart from giving uneven discharge, creates considerable stresses in the booms or articulated arms that are often used to support the outlet pipe. Also, the working strokes have to be long and the cylinder bores have to be of considerably greater diameter than the pipeline size in order to obtain acceptable efficiency on suction filling to reduce the pulsing and to maintain as continuous a flow as possible. Therefore reducer transitions have to be provided between the cylinders and the pipe line. Another drawback is that the concrete on its path into the cylinder often has to be sucked round angles of 90° or even 180° before the working stroke of the piston, and it does not readily flow round such angles.

It is an object of this invention to overcome, or at least partly eliminate, these problems.

According to the present invention there is provided an axial piston pump adapted for pumping concrete or other abrasive media and slurries, wherein the suction space with which the axial cylinders are in direct communication is equipped with guide means for solids in suspension, the arrangement being such that over a first, exposed part of the suction space all liquids and solids have free access to the cylinders and over a second part of the suction space, circumferentially downstream of the first path, said guide means is operative selectively to urge the media carried towards it into the cylinders by a wedging action, and to reject and return to the first part solids that are not correctly sized and/or positioned for entry into the cylinders in the second part.

For normal use the pump will be arranged so that there is gravity feed to the suction space. It will therefore be convenient hereafter to refer to the pump in that attitude with its axis vertical.

The guide means preferably takes the form of a wedge member curving around the axis of the pump from a point substantially at the centre of the suction space to a point in the region of the bottom dead centre position of the pistons. In preferred forms, the underside of this wedge member facing the cylinder block forms with the adjacent end face of said block an inverted V or U-shaped tunnel wide at the mouth and narrowing both in width and height to a point near the bottom dead centre position. The arcuate centre line of this tunnel will generally overlie the path of the piston and cylinders axes. The upper side of the wedge member preferably takes the form of a curved ramp leading up to a valve blade which divides the suction from the discharge side of the pump. This valve blade may extend diametrically across the pump and be offset by a small angle circumferentially downstream from the plane through the upper and lower dead centre positions of the pistons.

Slurry being gravity fed to the suction side either enters the cylinders directly during the first half of the pistons' suction stroke or is carried on the upper end face of the cylinder block towards the wedge member. The slurry that enters the mouth of the V or U-shaped tunnel is guided towards the centre of the cylinder path, where the land area between adjacent cylinders is a minimum, and is both drawn into the cylinders by the suction effect and pushed thereinto by the wedging effect of the tunnel roof. Any solids in the slurry that cannot readily enter the tunnel (for example those near the edges of the cylinder path) are carried up onto the curved ramp and return eventually by gravity and suction into the first suction part, where they have another chance of entering a cylinder. It will be understood that the cylinder bores will be of considerably greater diameter than the maximum size of solids to be handled by the pump.

The outlet side of the pump is of more conventional form. Preferably, a connector is provided which has a kidney shaped mouth for co-operating with a kidney shaped port over the outlet side and a circular outlet for fitting directly to the discharge pipeline.

It is important to keep pumps for concrete well lubricated, but it is also a requirement that there should be little chance for the highly abrasive sand to reach working parts of the pump other than the pistons and cylinders, and it is also undesirable for oil to have an opportunity for mixing in with the concrete. According to another preferred feature of the invention we provide a water barrier between the working face of the pistons and the piston rods and their drive mechanism. This may be achieved by making each piston double headed with a space between the heads. These spaces are filled by water which has access through ports in the side of the cylinder bore to a cavity of the cylinder block. A continuous circulation of water is maintained to lubricate the cylinders, both by the axial motion of the pistons and by the rotational motion of the cylinder block.

In order to accommodate shock loads from solid matter it is preferred to spring load the piston heads on cores, and to avoid excessive wear on the trailing lips of the cylinders, where they meet the working end face of the cylinder block, these lips may be cut away.

It is also desirable to water lubricate the working end face of the cylinder block, and in one preferred embodiment an annular water channel or groove, eccentric with respect to the pump axis, is provided in part of the pump housing that co-operates with the periphery of the working end face. With a supply of water to the groove at a higher pressure than pump outlet pressure, there is seepage radially inwards to lubricate the end face.

It is necessary carefully to wash out a concrete pump after use, and to facilitate this the pump housing may conveniently have trunnions or other means for pivoting it for ready access. As mentioned above, in use its axis will be vertical and it will generally be mounted beneath a hopper for liquid concrete.

Figure 2:
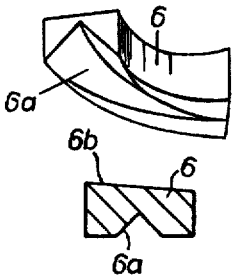
Figure 3:
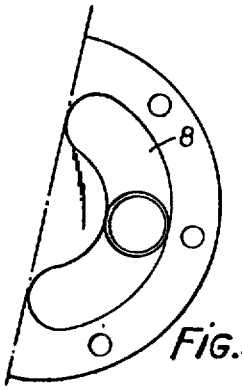
Figure 4:
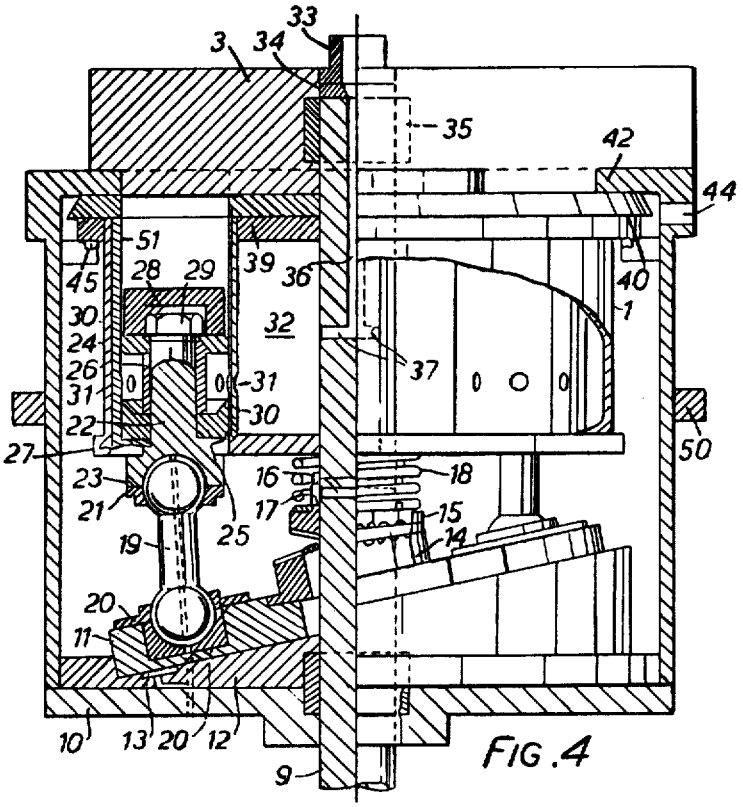
Figure 5:
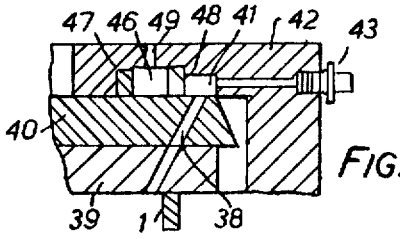

The invention may be performed in various ways and one constructional form thereof will now be described, by way of example, with reference to the accompanying drawings, in which:

FIG. 1 is a diagrammatic plan view of an axial piston pump showing the suction and discharge sides, FIG. 2 is a perspective view of guide means for the suction side of the pump, and a cross-section thereof, FIG. 3 is a diagrammatic plan view of an outlet connector for the pump, FIG. 4 is an axial section of the pump of FIG. 1, and FIG. 5 is a detail of FIG. 4.

Referring to FIG. 1, the axial piston pump has a cylinder block 1 with seven cylinders 2. The block 1 rotates in a clockwise direction as viewed in FIG. 1 and the suction side is on the left and the outlet side on the right of a valve plate or blade 3 which extends diametrically across the end face of the cylinder block at a small angle, 12° for example, to the line 4 between the upper and lower dead centre positions of the pistons 5. This retardation of the valve blade 3 is to avoid concrete mix being forced up under the blade, and possibly causing distortion and leakage, at the final stages of a delivery stroke when a piston is in the 5 or 6 o'clock region. The blade 3 may be fixed or be adjustable within limits.

It will be understood that concrete mix is fed by gravity to the suction side of the pump so that in normal use the semi-circular area ABC will be covered with the mix. Over the quadrant A to B the upper end face of the cylinder block 1 is exposed so that the mix can directly enter the cylinders 2. Over the quadrant B to C there extends guide means 6 shown in outline in FIG. 1 and in perspective view in FIG. 2. This guide means is an arcuate wedge member centred on the axis of the pump and presenting at B an inverted V-shaped mouth of a correspondingly shaped tunnel 6a that narrows both in width and length towards C. The centre line of this tunnel registers with the path of the axes of the pistons and cylinders. It reduces to a point at position C, while for a cylinder at the 10 o'clock position it cuts off two segments at the mouth and offers a restricted entry to that cylinder. The upper surface of the member 6 is a ramp 6b that extends upwardly from B towards C and which may also be canted inwardly towards the axis of the ramp.

Material that does not immediately enter the cylinders in the AB quadrant is carried on the end face of the cylinder block 1 towards the mouth of the tunnel of the member 6. Any large solids that hit the mouth of the tunnel are either directed up the ramp and return eventually by gravity and suction to join the other material being fed to the AB quadrant, or else are drawn into the tunnel where they are directed towards the centre of the path of the piston and cylinders. The pistons 5 are receding and the block 1 is rotating and therefore although a solid might not immediately be sucked into a cylinder it can be drawn along the tunnel and urged downwardly and towards the centre of the tunnel by the roof of the latter and by the suction effect of the pistons. It will then be drawn into a succeeding cylinder. If a solid is caught by the mouth of a cylinder and dragged along the tunnel the latter will urge it towards the centre of the piston path and also downwardly into that cylinder. In order not to have undue wear at the junction of each cylinder bore and block end face, the trailing edge of each cylinder mouth may be cut away as indicated at 7 on one of the cylinders in FIG. 1.

The outlet side of the pump has a funnel-like member 8 (FIG. 3) fitted thereto, the mouth adjacent the pump being kidney-shaped for fitting a correspondingly shaped outlet port and the outlet being circular for fitting directly to a pipe line, without a reducer transition section.

The pump will now be described in more detail with reference to FIG. 4. The rotary drive is applied to the cylinder block 1 by means of a shaft 9 fixed thereto or integral therewith and extending co-axially out from the base of a housing 10. A swash plate 11, of a fixed angle in this example, rotates on a ramp 12 through hydrostatic pads 13, being driven from the shaft 9 via bevel gears 14 and 15, the gear 15 being sleeved on the shaft and fixed against rotation with respect thereto by a pin 16 which extends radially from the shaft through an axial slot 17 in a sleeve portion of the gear 15. The latter is urged into engagement with the gear 14 fast with the swash plate 11 by means of a spring 18 reacting against the base of the cylinder block 1. The spring bias is provided primarily for the pump priming stage, when the swash plate might otherwise tend to lift off the ramp.

Piston rods 19 having spherical ends are captive to the swash plate 11 by means of readily replaceable socket and plate assemblies 20 and to the ends of the pistons 5 by means of plates 21. These ends are hydrostatically padded, the rods 19 being co-axially bored for the passage of oil and the swash plate, ramp and housing having oil ducting as shown in FIG. 4. Each piston comprises a main core 22 having an enlarged non-working end 23 with which the associated piston rod co-operates. There are two piston heads 24 and 25 spaced by a sleeve 26 and slidably mounted on the core 22. A flattenable, but normally dished spring washer 27 acts between a shoulder above the enlarged head end of the core 22 and the lower piston head 25 and cushions and limits downward movement of the piston heads and sleeve with respect to the core. This facility for limited axial movement is provided to reduce shock loading in the event of any small particles in the pumped material not allowing the normal full stroke of the piston. The piston head 24 has a cap 28 the interior of which is normally axially spaced from the head of a bolt 29 which is secured at the end of the core 22. This bolt 29 provides an axial stop against the piston head 24 escaping the core 22. At the perimeter of the working side of the piston head 24 there is bonded a triangular section sealing ring 30 of rubber or other resilient material, the rim of the cap 28 being cut away to accommodate this, and there is a similar ring 30 on the same side of the other piston head 25.

The cylinder block 1 is a hollow casting or of fabricated form and the walls of each cylinder have ports 31 which place the space between the piston heads 24 and 25 in communication with a central space 32 to which a continuous supply of water is maintained. These ports 31 may be continuously open whatever the piston position or at least are never exposed above the piston head 24 or below the piston head 25. The water supply to the space 32 is via a connection 33 central of the valve blade 3, a water seal 34 at the end of the shaft 9 where it is carried by a bearing 35 within the valve blade, a co-axial drilling 36 through the shaft 9 to a point within the block 1 and radial ports 37. The water eventually escapes through angled ports 38, one of which is shown in FIG. 5. These lead from the outer periphery of the space 32 through the top end plate 39 of the block 1 and through a replaceable ear plate 40 secured thereon to communicate with an annular groove 41 in the underside of a flange 42 of the housing 10. A connection 43 provides the escape from the groove 41. Any seepage of water at the interface of the flange 42 and the wear plate 40 operates as lubrication and drains through port 44 (FIG. 4). By virtue of the pumping action of the piston heads and the rotation of the cylinder block 1 centrifuging the water outwards from the ports 37 there is a continuous flow of water into each cylinder to wash and lubricate the walls and maintain the concrete mix well separated from the oil filled space containing the swash plate and pistons rod.

Each cylinder is lined with hard chromed liners 51 pressed or bonded in and retained by the replaceable wear plate 40. The perimeters of this wear plate and the end plate 39 project radially of the cylinder block and are axially confined between hydrostatic bearings 45 and the flange 42 of the housing 10. In addition to the groove 41 there may also be a water seal as shown in more detail in FIG. 5 between the co-operating faces of the flange 42 and the wear plate 40. This seal comprises an annular groove 46 in the underside of the flange 42 and having two sealing rings 47 and 48 against the radially inner and outer walls respectively, to leave a passage for water. Water supplied to this passage via an inlet 49 is maintained at a pressure greater than that of the normal outlet pressure of the pump so that there tends to be seepage of water radially inwards, thereby lubricating the face of the wear plate. This annular groove is not concentric with the axis of the pump but is slightly eccentric thereto so as to obtain a better spread of lubricating water, to reduce the heat generation and to assist heat dissipation.

The exterior of the housing 10 is provided with trunnions 50 to enable the whole pump to be pivoted easily away from its working position, for example to be washed out after use.

It is possible in some practical examples that the gears 14 and 15 cannot transmit sufficient torque. In another preferred arrangement (not shown) the perimeters of the underside of the cylinder block 1 and of the upper face of the swash plate 11 are provided with large diameter bevel gears that mesh below the top dead centre piston position. These will surround the piston rods 19 as opposed to being within the "cage" formed by those rods. [These] *There* will still be spring loading of the swash plate through one or more springs acting between the block 1 and the base of shallow conical thrust member resembling the gear 15 but without teeth, the conical face bearing on the swash plate.

It will be understood that other axial piston pumps giving continuous flow are possible and the number of pistons may differ from seven. For example instead of a swash plate pump, a tilting cylinder-block pump of the Thoma type may be used. It will also be understood that variable displacement versions of these pumps may be employed. All these pumps will work satisfactorily on liquids without solids in suspension. They are readily mounted on mobile trailers or directly on mixer trucks, and can be driven by a power take-off or an auxiliary prime mover. There is no requirement for any external valve mechanism hydraulically or otherwise operated. Also, the tunnel of the wedge member 6 can be of inverted U or other cross-sectional form.

It may often happen that the concrete mix delivered by hopper to the suction side of the pump is too static. To help the pump assimilate the mix it may be advisable to provide a re-mixer at the hopper delivery end or within a funnel that may form the inlet to the pump. This is a rotating blade or blades whose drive is conveniently taken from the pump prime mover. For example, the re-mixer drive shaft may be geared to or be chain driven from the shaft 9.

Although the pump has been described for convenience with its axis vertical, it can operate equally well in different attitudes provided gravity feed to the suction side can be established. For example, its axis may be horizontal with the suction side uppermost. There will then be provided a hopper or funnel adapted to channel concrete mix downwards and inwards towards the pump.

We claim:

1. An axial piston pump adapted for pumping concrete or other abrasive media and slurries, including a cylinder block with an annular array of axially parallel cylinders, each with a reciprocable piston therein and a working end face to which the cylinders open; bearing means for locating said block in an axially fixed position; means co-operating with said face to divide it into an inlet and a delivery side; means for reciprocating the pistons to give them suction strokes on the inlet side and pressure strokes on the delivery side, the strokes commencing at an upstream end and finishing at a downstream end of the respective side to draw and discharge media progressively into and from the cylinders; guide means disposed in the circumferentially downstream portion of the inlet side, leaving the upstream portion of the inlet side free and the full diametral extent of said cylinders exposed in that upstream portion, said guide means having a first surface facing said cylinder block and forming a convergent tunnel therewith, open at the upstream end and narrowing in height [and width] towards the downstream end to urge media carried towards said guide means into the cylinders by a wedging action, and a second surface facing away from said cylinder block to reject and return to the upstream portion solids that are not correctly sized and/or positioned for entry into the cylinders in the downstream portion.

2. A pump as claimed in claim 1, wherein the piston heads are spring loaded on cores.

3. A pump as claimed in claim 1, wherein the trailing lip of each cylinder, where it meets the working end face of the cylinder block, is cut away.

4. A pump as claimed in claim 1, wherein said tunnel is inverted U or V shape.

5. A pump as claimed in claim 1, wherein said tunnel has an arcuate centre line overlying the path of the piston and cylinder axes.

6. A pump as claimed in claim 1, wherein the pump housing has trunnions for tiltable mounting about an axis transverse to the pump axis.

7. A pump as claimed in claim 1, wherein a kidney shaped port provides the outlet on the discharge side of the pump and a discharge pipe connection merging from the kidney shape to a circular shape is fitted thereon.

8. A pump as claimed in claim 1, wherein means are provided for water lubrication of the working end face of the cylinder block.

9. A pump as claimed in claim 8, wherein said lubrication means includes an annular water channel eccentric with respect to the pump axis, in part of the pump housing that co-operates with the periphery of said working end face.

10. A pump as claimed in claim 1, wherein the dividing means includes a valve blade diametrically across said working face and said second surface is in the form of a curved ramp leading up to said valve blade from the upstream end of said guide means.

11. A pump as claimed in claim 10, wherein said valve blade is offset a small angle circumferentially downstream from the plane through the upper and lower dead centre positions of the pistons.

12. A pump as claimed in claim 1, wherein a fluid barrier is continuously provided between the working faces of the pistons and said reciprocating means, the pistons being double headed with a space between the heads which is filled by fluid.

13. A pump as claimed in claim 12, wherein the cylinder block is hollow and provided with fluid supply and escape means, and the cylinders have ports for transverse flow of said fluid in the piston head spaces.

14. A pump as claimed in claim 13, wherein the fluid supply is central of the block, whose rotation provides centrifugal flow of said fluid to and through said cylinders.

15. A pump as claimed in claim 14, wherein an angled ramp supports the swash plate and spring means press the swash plate thereon, reacting against the cylinder block.

*16. A pump as claimed in claim 1, wherein said convergent tunnel narrows in width towards the downstream end.*

* * * * *